US007121610B2

(12) United States Patent
Nguyen

(10) Patent No.: US 7,121,610 B2

(45) Date of Patent: Oct. 17, 2006

(54) COMBINATION SHADE AND HANDLE DEVICE

(76) Inventor: Hai Minh Nguyen, 2165 Maroel Dr., San Jose, CA (US) 95130

( * ) Notice: Subject to any disclaimer, the term of this patent is extended or adjusted under 35 U.S.C. 154(b) by 0 days.

(21) Appl. No.: 10/919,851

(22) Filed: Aug. 16, 2004

(65) Prior Publication Data

US 2006/0033354 A1 Feb. 16, 2006

(51) Int. Cl.
*B60J 3/02* (2006.01)

(52) U.S. Cl. .................. 296/97.1; 296/97.7; 296/97.8; 296/97.9; 296/1.02

(58) Field of Classification Search ............... 296/97.1, 296/97.7, 97.8, 97.9, 1.02
See application file for complete search history.

(56) References Cited

U.S. PATENT DOCUMENTS 928,864 A 7/1909 Hoyt
2,547,373 A 4/1951 Camp
3,156,294 A 11/1964 Miller et al.
3,183,033 A 5/1965 Stulbach
3,584,910 A * 6/1971 Lupul ........................ 296/97.6
4,261,411 A 4/1981 Dieterich
4,335,773 A 6/1982 Masi
4,640,543 A * 2/1987 Bradley ...................... 296/152
4,687,246 A * 8/1987 Mousel ...................... 296/97.7
4,707,018 A * 11/1987 Gavagan ..................... 296/152
4,749,222 A * 6/1988 Idland ........................ 296/152
4,758,041 A 7/1988 Labeur
4,762,358 A 8/1988 Levosky et al.
4,792,177 A * 12/1988 Svensson .................... 296/152
4,869,542 A 9/1989 Lin
4,932,711 A 6/1990 Goebel
4,979,775 A 12/1990 Klose
D339,098 S 9/1993 Cooper
5,390,973 A * 2/1995 Melotti ...................... 296/97.5
5,404,926 A 4/1995 Ojima et al.
5,443,923 A 8/1995 Laniado et al.
5,560,668 A 10/1996 Li
5,575,524 A 11/1996 Cronk
5,683,134 A * 11/1997 Espinosa .................. 296/97.8
6,086,133 A 7/2000 Alonso
6,227,600 B1 * 5/2001 Chen ......................... 296/97.2

* cited by examiner

*Primary Examiner*—Joseph D. Pape
(74) *Attorney, Agent, or Firm*—Tran & Associates

(57) ABSTRACT

A combination window shade and handle device includes a frame adapted to be secured above a window of a motor vehicle window; a handle centrally positioned on the frame; a winding core coupled to the frame; a shade wound onto the winding core, the shade having one free end and one fixed end adhered to the winding core, the shade having a surface area which can substantially cover a selected surface area of the window; and a tab positioned at the free end of the shade to allow a user to engage the shade.

9 Claims, 7 Drawing Sheets

COMBINATION SHADE AND HANDLE DEVICE

BACKGROUND

The present invention relates to the field of vehicle window shades and cabin handles, and in particular to an improved automobile windshield shade arrangement.

Automobile sun shade arrangements are well known in the art. Such shades protect the interior of the automobile from damaging sun rays and block the view to the interior from the front of the automobile to discourage theft. A common, inexpensive, but unpopular shade comprises a portable foldable or collapsible cardboard or cloth device which must be manipulated, often with great difficulty, to a manageable size for storage. Even in the completely collapsed state, however, the size is generally too large to store in the glove compartment or other convenient and concealed location within the automobile.

Attempts to solve these problems have been offered but without success or acceptance by the purchasing public. Some examples of prior art efforts follow.

U.S. Pat. No. 5,575,524 to Cronk shows an arrangement in which a shade is wound onto a winding core, the wound shade being housed between a rigid window frame of the automobile and a cover. The cover has a slot in it through which the shade is manually pulled horizontally across the inside of the windshield and fastened at the opposite side of the windshield.

U.S. Pat. No. 5,560,668 to Li uses a vertically moveable shade, the roller for the shade being mounted horizontally along the top of the windshield on the inside of the automobile. A pair of gapped pipes disposed on left and right sides of the windshield receive sliders coupled to a horizontal moving rod to which the bottom of the shade is attached. Moving the movable rod up and down moves the sliders within the gapped pipes which serves to raise and lower the shade.

U.S. Pat. No. 5,443,923 to Laniado et al. is another sun shade adapted for attachment across a vehicle surface for protecting the interior of the vehicle against sun rays, the shade having a vertical roller. The shade is pulled off of the wound vertical roller to extend horizontally across the inside of the windshield and connect to the opposite side.

U.S. Pat. No. 5,404,926 to Ojima et al. teaches a roller shade having a spring-loaded retractor about which a sun shade is rolled. And a power drive unit is employed to raise and lower a horizontal rod to which the free end of the shade is attached, the power drive unit working against the spring force of the retractor. In one embodiment, the drive unit is placed below the center of the windshield, and a system of pulleys raises and lowers the shade, again from a shade retractor disposed along the lower edge of the windshield. In such a device, the stress on the shade increases as the shade is extended, leading to damage or unsightly wrinkling of the shade.

U.S. Pat. No. 4,979,775 to Klose discloses a window shade wrapped about a winding shaft at the top of the windshield. The free end of the shade is attached to an axially displaceable shaft, the shaft moving up and down to retract and extend the shade.

U.S. Pat. No. 4,932,711 to Goebel shows an automobile windshield shade having a tubular base attached to the dash of an automobile, and the bottom of an accordion pleated shade is attached to the base. A batten is used to hook the shade to the top of the windshield. Tension means at the base pulls the strings down to collapse the pleated fabric.

U.S. Pat. No. 4,869,542 to Lin is another example of a sun visor for an automobile in which a shade is rolled on a retractor at the base of the window, and the shade is manually pulled upwardly to hook at the top of the window in the extended position of the shade.

U.S. Pat. No. 4,762,358 teaches the use of a plurality of shade retractors mounted along the top of a windshield of an automobile and manually extendable to hook to a fastener on the bottom of the windshield.

U.S. Pat. No. 4,758,041 to Labeur shows a glare protection device for the rear window of a passenger car in which the shade is unrolled from a roll bar by means of a ball and screw arrangement. Rotating the screw in one direction raises the shade against the spring bias of the roll bar, and rotating the screw in the opposite direction lowers the ball and the shade coupled thereto.

U.S. Pat. No. 4,335,773 to Masi is another example of a sun curtain rolled on a retractor mounted at the bottom of a window and manually raised to hook on a fastener at the top of the window.

U.S. Pat. No. 4,261,411 to Dieterich is another example of a sun shade having a bottom roller or retractor about which a shade is rolled, the free end of the shade being manually connected to the top of the window. The sun shade of Dieterich is designed for the sloping rear windows of a hatchback car and has slots in it so that the person in the vehicle may have a degree of sun shade protection and yet have a view to the rear through the shade.

U.S. Pat. No. 3,183,033 to Stulbach shows yet another example of a shade retractor mounted at the bottom of a window of a vehicle and which is manually raised against the spring action of the retractor and hooked to the fasteners at the top of the window.

U.S. Pat. No. 3,156,294 to Miller et al. is directed to a spring-loaded hold-down device for keeping Venetian blinds from whipping around in the wind and banging against the window frame when the window is open.

U.S. Pat. No. 2,547,373 to Camp teaches a self-contained rising shade in which the rolled shade is disposed at the bottom of the automobile window, and the extended portion has a handle at its center which may be manually raised to be supported by a pair of resilient bands on each side of the shade member.

U.S. Pat. No. 928,864 to Hoyt discloses a spring-actuated shade having a weighted shade bar at the lower end adapted to frictionally engage the walls of guide ways, the shade bar being automatically returned to a horizontal position after being inadvertently tilted.

U.S. Pat. No. DES 339,098 to Cooper appears to be another version of an automobile sun shade which is wound on a roller at the bottom of the windshield and is manually extendible upwardly to be hooked to the top of the windshield.

U.S. Pat. No. 6,086,133 to discloses a vehicle window shade arrangement for at least partially shading the windshield of a vehicle, such as an automobile, having a dash with an upper surface and an elongated opening in the surface extending along the width of the windshield, the window shade arrangement comprising a shade rolled about a shade tube rotatably mounted below the upper surface of the dash; a shade extender-retractor for selectively unrolling the shade from the shade tube to an extended position at least partially shading the windshield, and rolling the shade about the shade tube to a retracted position not shading the windshield; and left and right elongated side supports disposed adjacent left and right sides, respectively, of the windshield. The shade is supported and concealed by the left and right side supports when not retracted. The shade extender-retractor may comprise a manual or powered drive arrangement for driving the shade to the extended and retracted positions. An automatic covering arrangement covers the elongated opening in the dash when the shade is retracted. The shade arrangement may be equally applied to vehicles other than automobiles and may be employed to shade end and/or side windows of such vehicles.

SUMMARY

In one aspect, a combination window shade and handle device includes a frame adapted to be secured above a window of a motor vehicle window; a handle centrally positioned on the frame; a winding core coupled to the frame; a shade wound onto the winding core, the shade having one free end and one fixed end adhered to the winding core, the shade having a surface area which can substantially cover a selected surface area of the window; and a tab positioned at the free end of the shade to allow a user to engage the shade.

In another aspect, a combination window shade and handle device includes a frame having two hooks adapted to engage a rigid window frame of a motor vehicle window; a handle centrally positioned on the frame; a winding core coupled to the frame; a shade wound onto the winding core, the shade having one free end and one fixed end adhered to the winding core, the shade having a surface area which can substantially cover a selected surface area of the window; and a tab positioned at the free end of the shade to allow a user to engage the shade.

In yet another aspect, a combination window shade and handle device includes a frame having two hooks adapted to engage a rigid window frame of a motor vehicle window; and a shade having one fixed end adhered to the frame, the shade having a surface area which can substantially cover a selected surface area of the window.

Advantages of the device may include one or more of the following. The window shade protects the interior of the vehicle from sunlight and provides a handle at the same time. The window shades minimize glares from sunlight, thus enhancing driving experience. The window shades also enhance visibility. Additionally, by blocking ultraviolet rays from the eye, the shades minimize retinal damage. The window shades can be used discreetly and safely. Since they are screwed to the cabin of the vehicle or hooked to a door frame that is closed during travel, they are less susceptible to becoming detached in a collision. Because the shade devices of this invention are concealed, they do not detract from the driver's view of the road. The shades can be manually operated or electrically operated, adding to reliability and ease of use. Finally, these shades provide aesthetic improvements and design capabilities.

BRIEF DESCRIPTION OF THE DRAWINGS

These and other aspects of the invention will be better understood, and additional features of the invention will be described hereinafter having reference to the accompanying drawings in which.

DESCRIPTION

As used herein, the term "motor vehicle" is intended to include vehicles containing electric, internal combustion engines, or other propulsion mechanisms which travel in the air, on water, or on land. These include automobiles, trucks, boats, and airplanes. Nearly every one of these motor vehicles has a windshield and an interior cabin which often includes a dashboard, steering mechanism, and one or more seats. One of the primary objects of this invention is to prevent the overheating of these surfaces by the sun to minimize premature degradation of the polymeric and painted surfaces, and to increase user comfort.

Figures 1, 3:
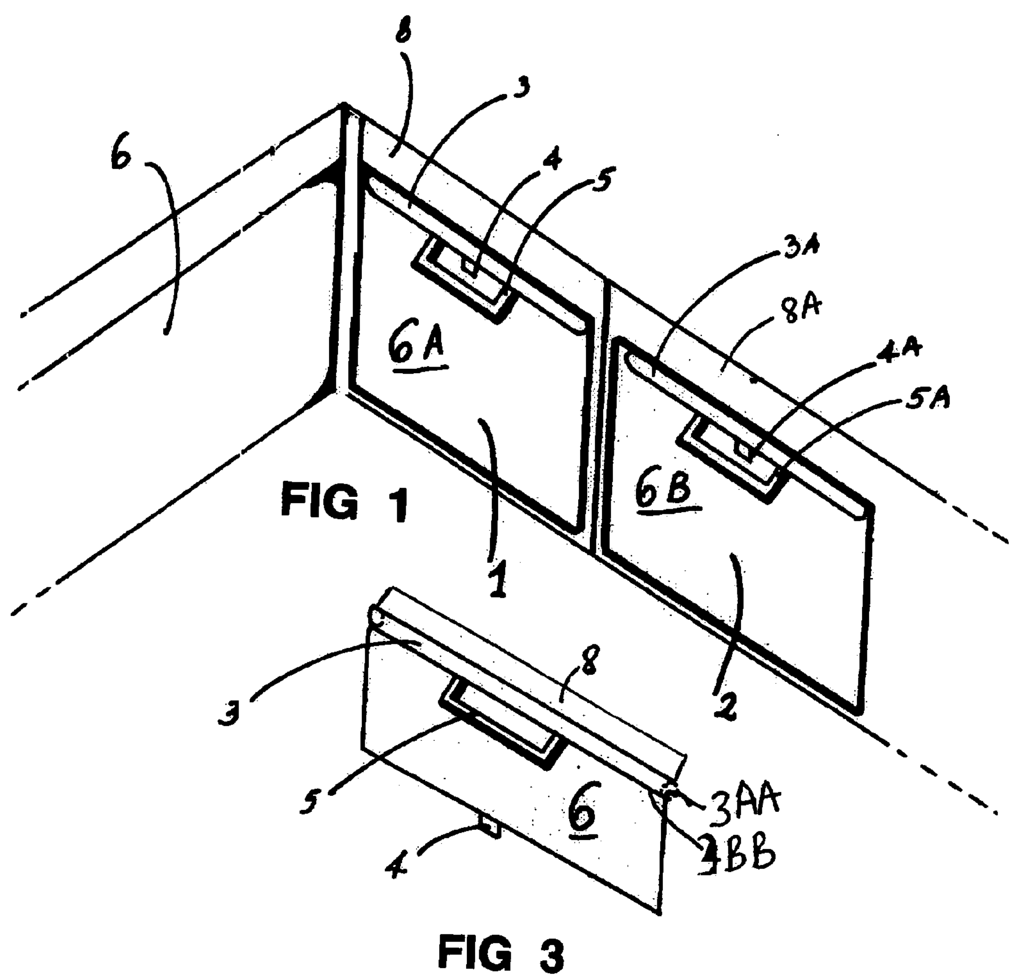
FIG. 1 is a perspective view of a vehicle cabin with a plurality of combination of shade and handle devices.
FIG. 3 is a perspective view of an exemplary device in FIG. 1.
Figure 2:
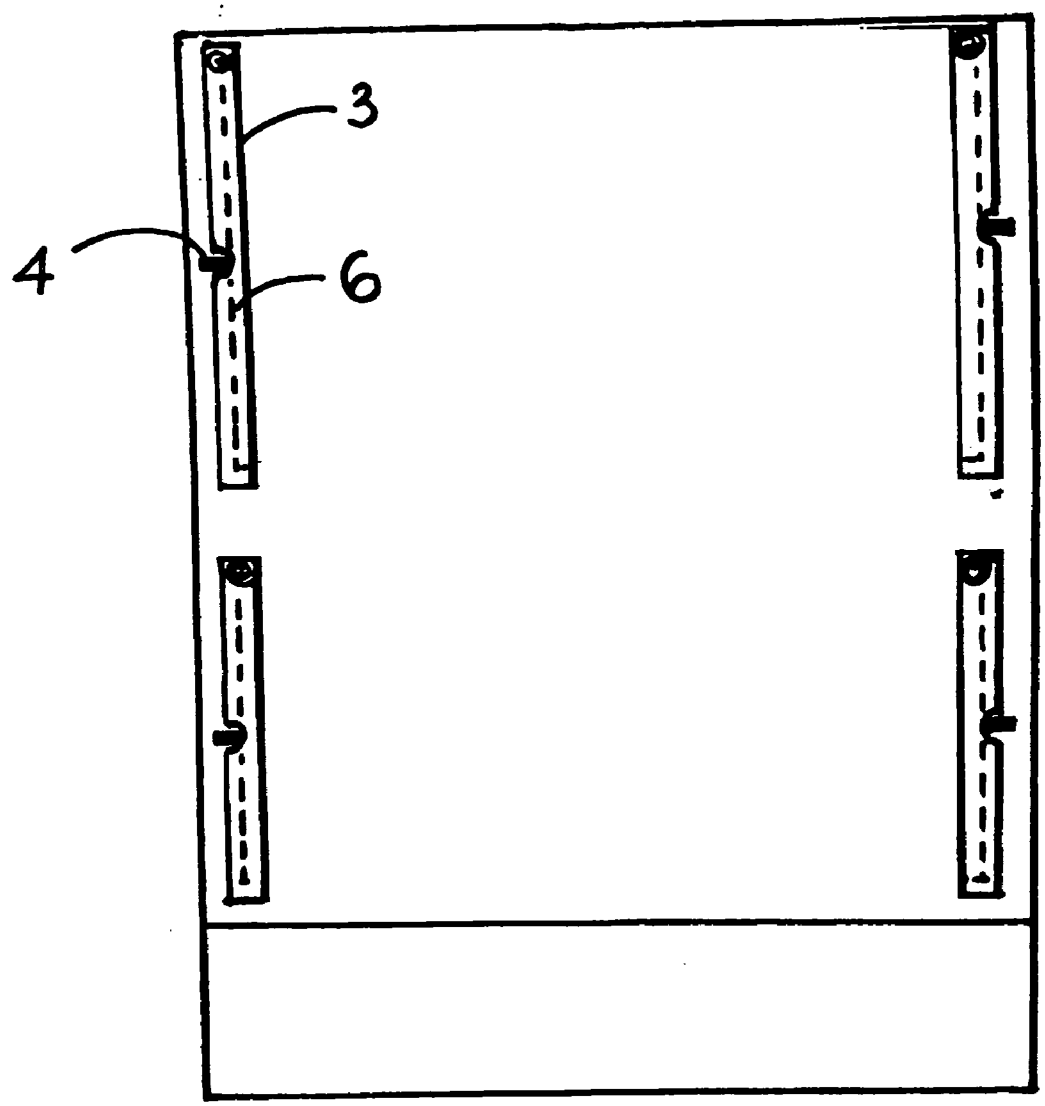
FIG. 2 is a top view of a vehicle with the devices of FIG. 1.
Figure 4:
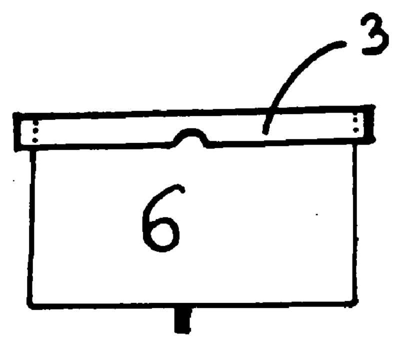
FIG. 4 is a front view of the exemplary device of FIG. 3.

FIG. 1 shows a first embodiment of combined sun-screen and handle devices mounted on windows 1 and 2 to reduce the amount of sunlight from entering a motor vehicle such as a car. FIG. 2 is a top view of a vehicle with the devices of FIG. 1; FIG. 3 is a perspective view of an exemplary device in FIG. 1; and FIG. 4 is a front view of the exemplary device of FIG. 3.

Referring to FIGS. 1–4, each device has a frame 8 that is secured in the vehicle cabin just above a window frame of a motor vehicle window. As is typical, the window is made of glass or other transparent material and is supported in the rigid window frame. The center of frame 8 is shaped such that when secured to the vehicle, frame 8 together with cover 3 acts as a handle 5 that a passenger can hold on to while being transported in the vehicle or while the passenger is attempting to enter/exit the vehicle.

Roller cover 3 houses a winding core (3AA) and a shade 6 wound onto the winding core 3AA. The winding core 3AA is swivelly mounted between the frame and the cover. The shade 6 has one free end and one fixed end adhered to the winding core, and has a surface area which can substantially cover a selected surface area of the window. Further, a gripping strip or pull tab 4 is positioned at the free end of the shade 6 to allow a user to engage or disengage the shade 6. In one embodiment, the cover 3 has a slotted opening 3BB for receiving the pull tab 4 and the free end of the shade 6.

In the retracted position of the shade, pull tab 4 extends only far enough out of cover 3 so that it can be grasped by a hand. In the vicinity of and just inside cover 3, winding shaft or core is mounted for rotation by means of stub shafts in bearing brackets. In one embodiment, toward each end of the winding core there are gear wheels which are fixed for rotation on the shaft and which mesh with respective rack-like toothing.

Shade 6 can be an opaque or semiopaque foil or a fabric. The foil can be perforated, while the fabric can be woven with such a distance between its threads that it appears semi-translucent. The foil or fabric can be coated on its outside so as to be light reflective in order, in this way, to reflect incident sun rays and thereby reduce the heating of the inside of the car.

Correspondingly, the second device has a frame 8A adapted to be secured above a window frame of a motor vehicle window. As is typical, the window is made of glass or other transparent material and is supported in the rigid window frame. The frame has a handle 5A that is centrally positioned on the frame 8A. A roller cover 3A houses a winding core (not shown) and a shade 6B wound onto the winding core. The winding core is swivelly mounted between the frame and the cover. The shade 6A has one free end and one fixed end adhered to the winding core, and has a surface area which can substantially cover a selected surface area of the window. Further, a pull tab 4A is positioned at the free end of the shade 6 to allow a user to engage or disengage the shade 6A. In one embodiment, the cover 3A has a slotted opening for receiving the pull tab 4A and the free end of the shade 6A.

The cover 3 can also include electronics such as lights, fan or audio electronics. For instance, a light and on/off button can be positioned on the cover 3. Also, a fan can be positioned on the cover 3. Further, electronics such as speaker and amplifier can be mounted on frame 8 and cover 3. This list is exemplary, and other devices can be embedded in or on cover 3.

During installation, frame 8 with roller shade 6 is mounted so that it will completely clear the top of the window frame. Mounting brackets are aligned and level with each other. The mounting brackets can be positioned outside frame 8, inside the frame 8, or into the ceiling of the cabin.

Figure 5:
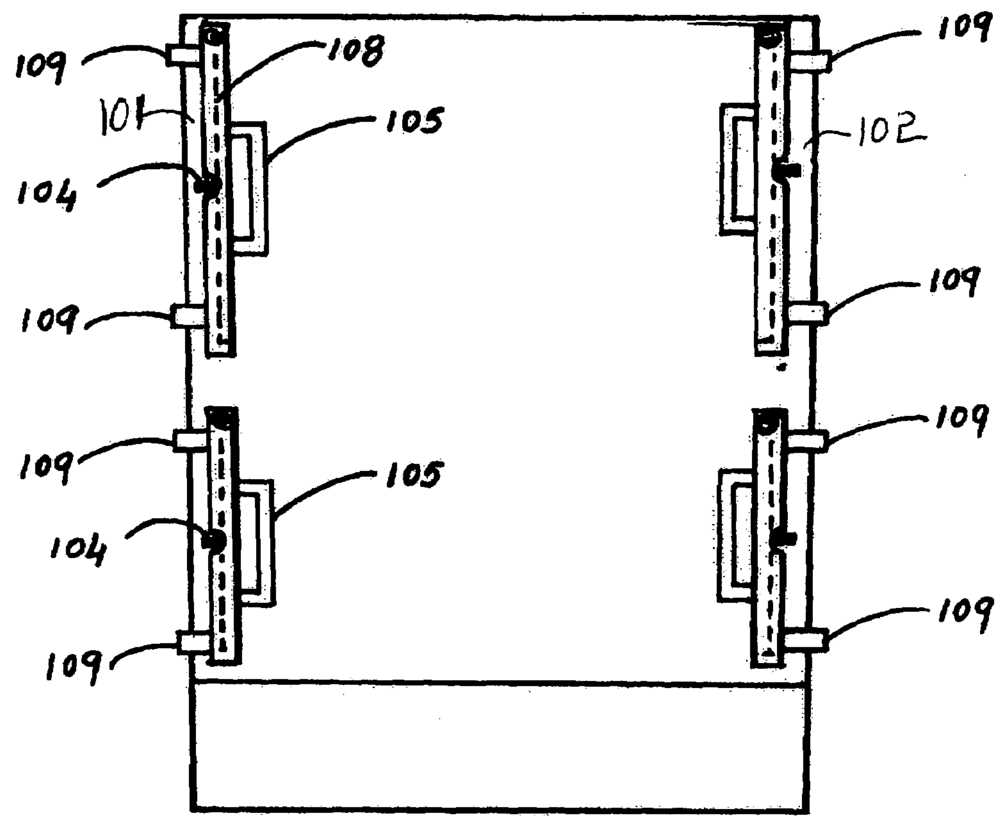
FIG. 5 is a top view of a vehicle with a plurality of second embodiments of the combination of shade and handle devices.
Figure 6:
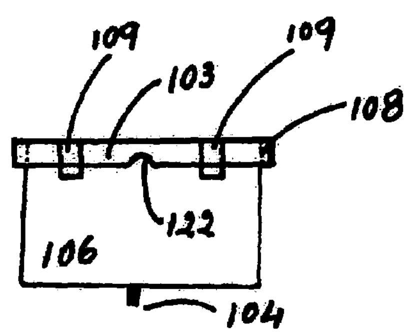
FIG. 6 is a front view of one of the embodiments of FIG. 5.
Figure 7:
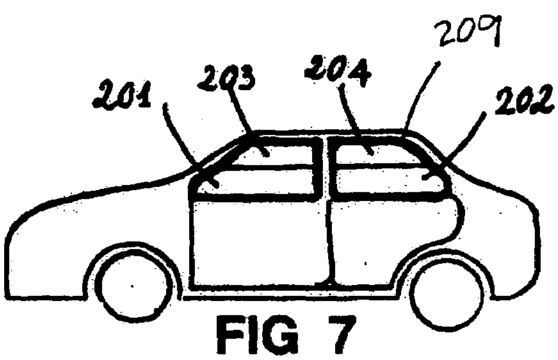
FIGS. 7–11 show a third embodiment of car shade devices.
Figure 8:
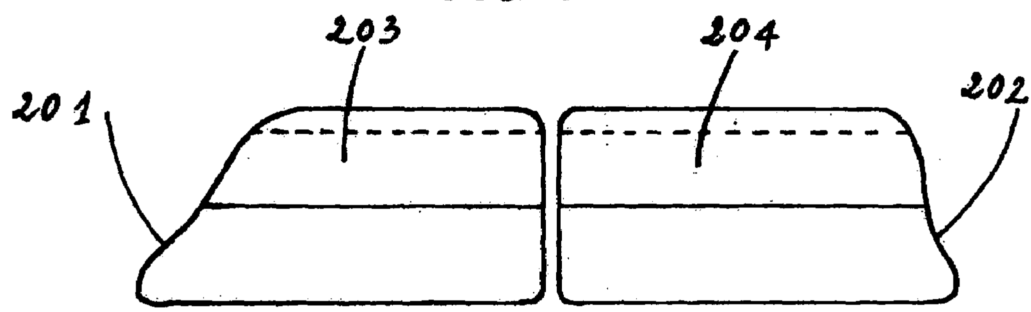
Figure 9:
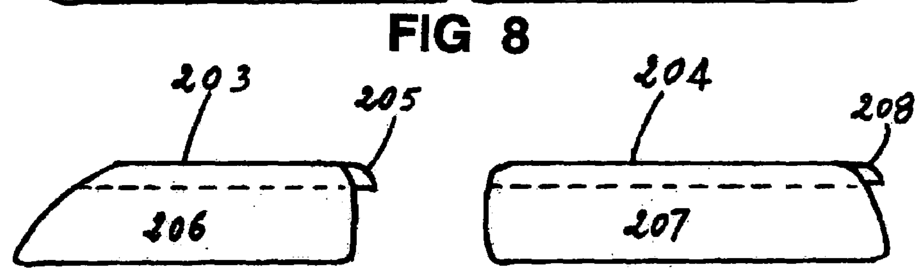

FIGS. 5–6 show the second embodiment of combined sun-screen and handle devices mounted on windows 101 and 102 to reduce the amount of sunlight from entering a motor vehicle such as a car. FIG. 5 is a top view of a vehicle with a plurality of second embodiments of the combination of shade and handle devices, while FIG. 6 is a front view of one of the embodiments of FIG. 5. Each device has a frame 108 having two hooks 109 adapted to engage a rigid window frame of a motor vehicle window. As is typical, the window is made of glass or other transparent material and is supported in the rigid window frame. A handle 105 is centrally positioned on the frame 108. A roller cover 103 houses a winding core (not shown) and a shade 106 wound onto the winding core. The winding core is swivelly mounted between the frame and the cover. The shade 106 has one free end and one fixed end adhered to the winding core, and has a surface area which can substantially cover a selected surface area of the window. Further, a gripping strip or pull tab 104 is positioned at the free end of the shade 106 to allow a user to engage or disengage the shade 106. In one embodiment, the cover 103 has a slotted opening for receiving the pull tab 104 and the free end of the shade 106. As shown in FIG. 6, the cover 103 has a semicircular recess 122 to allow the pull tab 104 to be stowed away.

During operation, a driver or a passenger places hooks 109 of frame 108 over the window frame and briefly holds frame 108 on the window frame while he or she closes the vehicle door. The pull tab 104 can then be engaged to move shade 106 to cover an appropriate area over the window to reduce sunlight radiation from reaching the vehicle's cabin. When sunlight is no longer an issue, the user can open the door and remove/store the device so that it is out of the way, thus enhancing the appearance or viewable area of the window.

FIGS. 7–11 show another embodiment of combined sun-screen and handle devices mounted on windows 201 and 202 to reduce the amount of sunlight from entering a motor vehicle such as a car. Each device of FIGS. 7–11 has a frame 203 having a ledge 205 or alternatively one or more hooks adapted to engage a rigid window frame of a motor vehicle window. The shade 206 has one free end and one fixed end adhered to the frame 203, and has a surface area which can substantially cover a selected surface area of the window 201. For window 202, a frame 209 has a ledge 208 or alternatively one or more hooks adapted to engage a rigid window frame of a motor vehicle window. The shade 207 has one free end and one fixed end adhered to the frame 209, and has a surface area which can substantially cover a selected surface area of the window 202.

Figure 10:
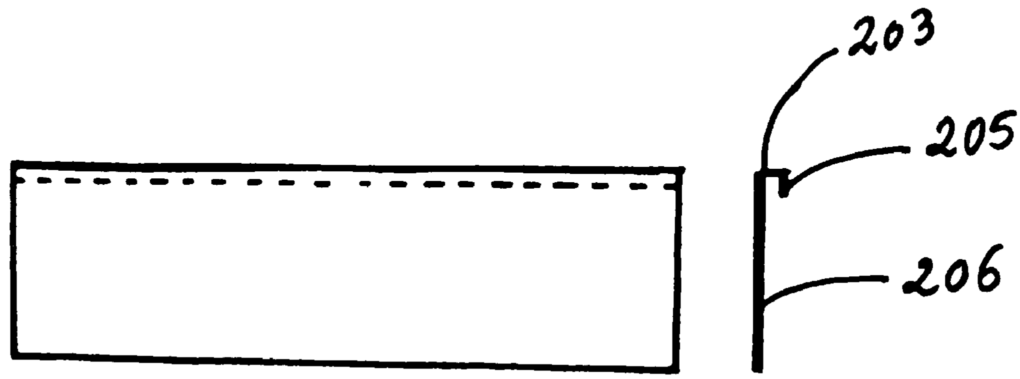
Figure 11:
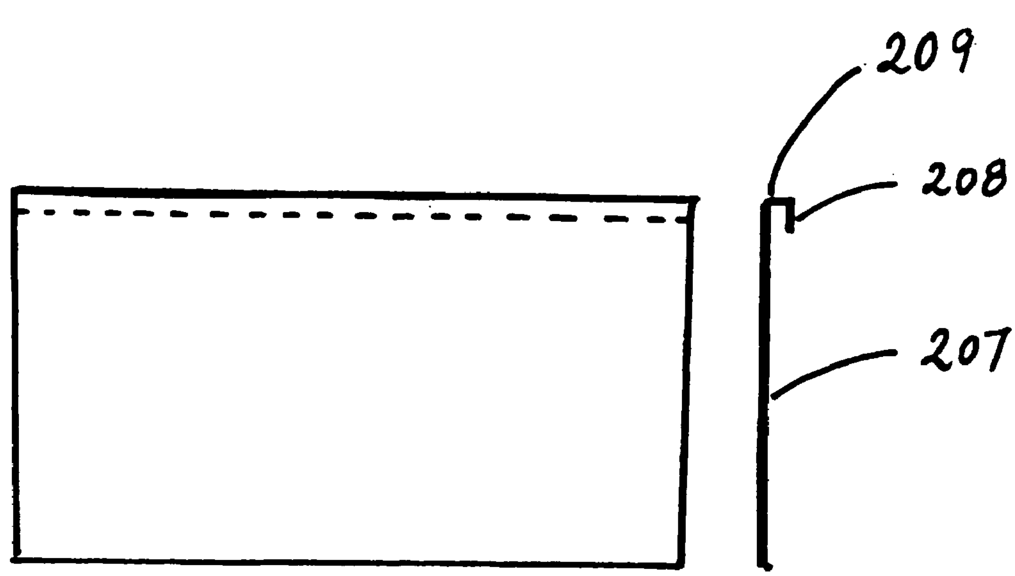

During operation, a driver or a passenger places the ledge 205 of frame 203 over the window frame and briefly holds frame 203 on the window frame while he or she closes the vehicle door. When sunlight is no longer an issue, the user can open the door and remove/store the device so that it is out of the way, thus enhancing the appearance or viewable area of the window. As shown in FIGS. 10–11, the length of the shade 206 or 207 can vary to cover different window sizes. In another embodiment, the shade 206 or 207 and the ledge 205 or 208 are made from a single sheet without requiring any frame.

The shade 6–6A, 106–106A and 206–206A can be washable. As known in the art, the shade can be a thin, somewhat rigid, sheet which is tinted or rendered opaque to limit the passage of sunlight. Such shades can be perforated with a plurality of regularly or irregularly spaced holes or shaped apertures. In one embodiment, the exterior facing side of the shade is made to be reflective, or has a lighter color or tone than the interior surface facing the motor vehicle cabin. Since the space necessary for accommodating the combined window shade and handle device is as small as possible so as to avoid interfering with the passengers' vision, or upsetting the aesthetic balance of the cabin, the shade can be manufactured from thin coated paper, or a strong thin sheet of polymeric materials, such as Mylar™ film, nylon, PEEK, polyethylene, polyvinylchloride, polystyrene, and copolymers and mixtures thereof. The shade can also be made from thin flexible materials and may be compatible in fabric, color and style to the interior of the automobile. For example, for a vinyl covered interior, a vinyl covered mesh fabric can be used, such as that marketed under the tradename SHADEBRELLA from Phifer Wire Products, Tuscaloosa, Ala.

Figure 12:
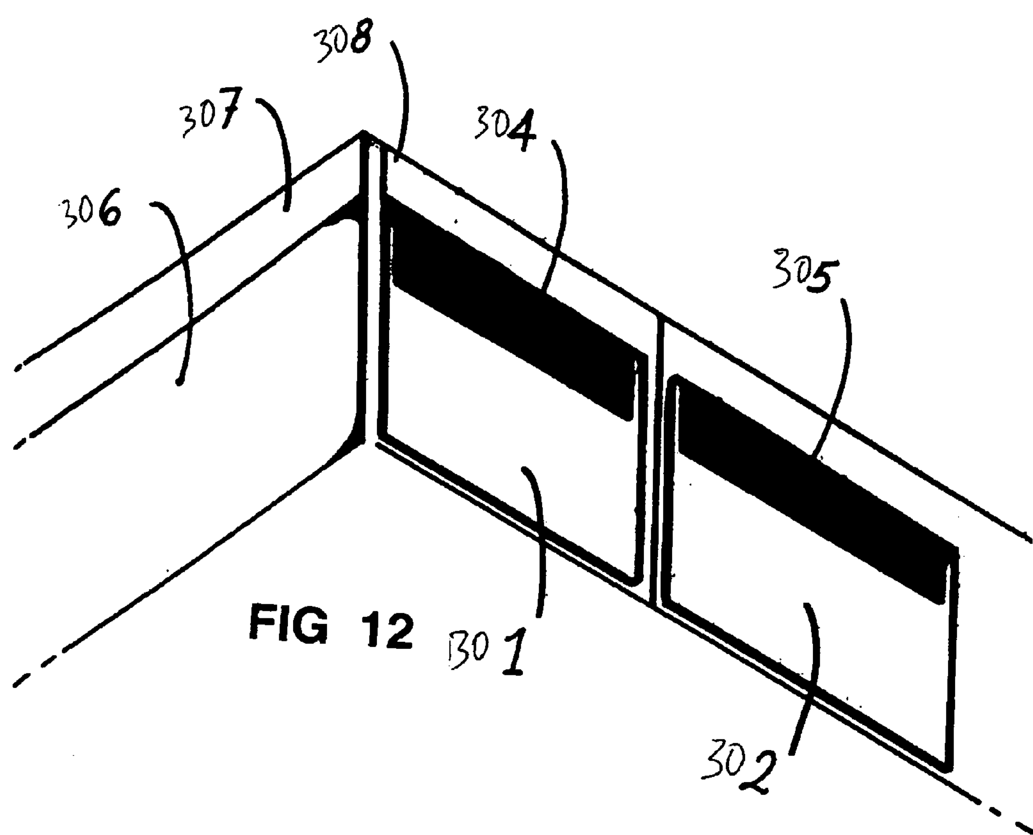
FIGS. 12–13 show another embodiment of a car shade.
Figure 13:
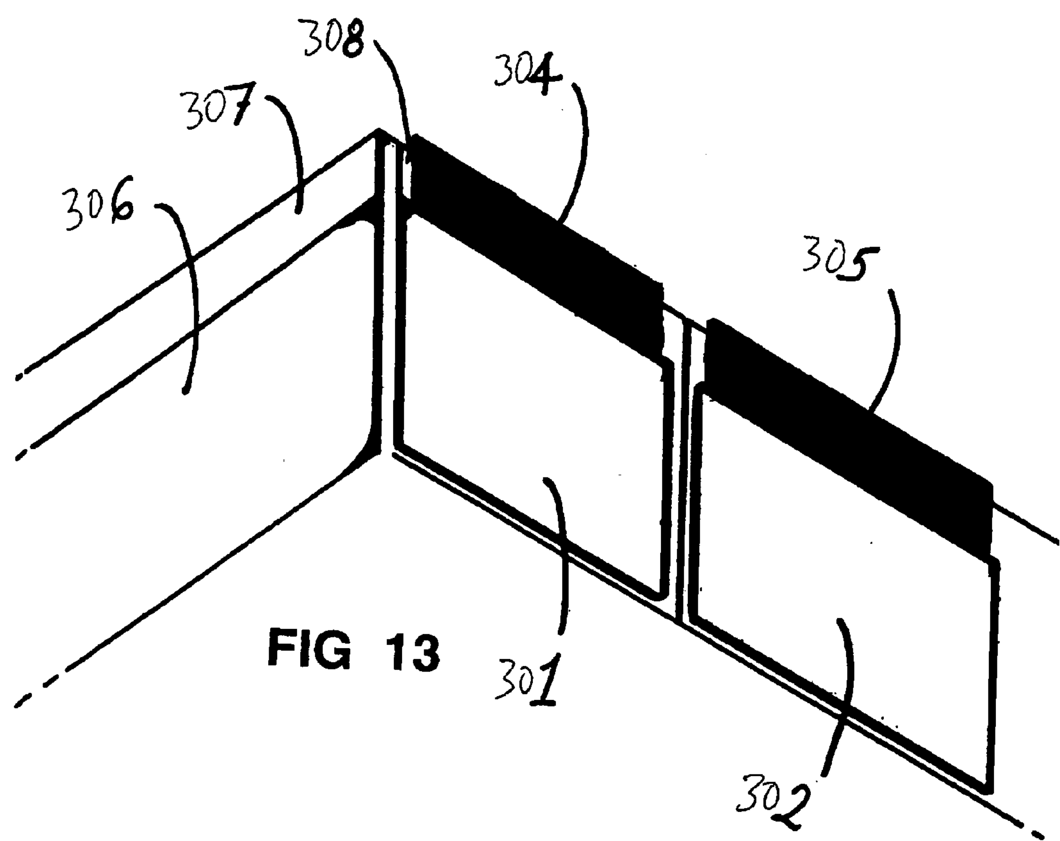

FIGS. 12–13 show another exemplary embodiment that is connected to the ceiling of the car. In FIG. 12, a front window 306 is connected to a frame 307. On a side of the frame 307 is a window frame 308 that support car windows 301–302. Shades 304–305 are mounted to cover windows 301–302, respectively. In FIG. 12, the shades 304–305 are in the extended cover (or down) position to protect the windows from sunlight. In FIG. 13, the shades 304–305 are in an up position to allow visibility and when sunlight protection is not required.

Additionally, as known in the art, the shade can readily be made to operate automatically through electric motor power. In such an embodiment, it would be desirable to have a linking mechanism disposed in the header and/or dashboard, and attached to a portion of the shade so that when the motor is activated, the shade is driven by the linkage into the unwound position. In order to promote a pleasing aesthetic appearance, this linkage or driving mechanism could be completely enclosed behind the header interior panel and/or the outer interior panels surrounding the windshield or window. The cover which conceals the shade could be made of plastic, metal, wood, or composite materials, and contoured and tinted so as to blend in completely with the remaining cabin features.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it can be realized that the device provides combined handle/window shade devices which are safer and more aesthetically pleasing than known prior art shades for motor vehicles. The inventive concepts can equally apply to any vehicle windshield, rear window, and/or side window.

Although various embodiments have been illustrated, this is for the purpose of describing, and not limiting the invention. Various modifications, which will become apparent to one skilled in the art, are within the scope of this invention described in the attached claims.

The invention claimed is:

1. A combination window shade and handle device, comprising:

a frame having two hooks adapted to engage a rigid window frame of a motor vehicle window;

a handle centrally positioned on the frame;

a winding core coupled to the frame;

a shade wound onto the winding core, the shade having one free end and one fixed end adhered to the winding core, the shade having a surface area which can substantially cover a selected surface area of the window and the shade comprising a semi-rigid sheet; and a tab positioned at the free end of the shade to allow a user to engage the shade.

2. The device of claim 1, further comprising a cover to protect the core and the shade.

3. The device of claim 2, wherein the cover comprises a slotted opening for receiving the free end of the shade.

4. The device of claim 2, wherein the winding core is swivelly mounted between the frame and the cover.

5. The device of claim 1, wherein each hook is U-shaped.

6. The device of claim 2, wherein the cover comprises one or more of: a light, a fan, and a speaker.

7. The device of claim 1, wherein the shade comprises one of: opaque foil, semi-opaque foil, fabric.

8. The device of claim 1, wherein the shade comprises a sheet which is tinted or rendered opaque to limit the passage of sunlight.

9. The device of claim 1, wherein the shade is perforated.

* * * * *